(12) United States Patent
Baek et al.

(10) Patent No.: US 7,281,865 B2
(45) Date of Patent: Oct. 16, 2007

(54) BIDIRECTIONAL OPTICAL TRANSCEIVER

(75) Inventors: Jae-Myung Baek, Suwon-si (KR); Joong-Wan Park, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 11/521,037

(22) Filed: Sep. 14, 2006

(65) Prior Publication Data

US 2007/0098335 A1 May 3, 2007

(30) Foreign Application Priority Data

Oct. 31, 2005 (KR) ............... 10-2005-0103237

(51) Int. Cl.
*G02B 6/36* (2006.01)
*H04B 10/00* (2006.01)

(52) U.S. Cl. .................. 385/92; 385/88; 385/94; 385/24; 398/135; 398/139

(58) Field of Classification Search ............ 385/14, 385/24, 31, 88, 89, 92, 94; 398/79, 82, 85, 398/135, 138, 139
See application file for complete search history.

(56) References Cited

U.S. PATENT DOCUMENTS

| 4,767,171 | A | 8/1988 | Keil et al. ............ 350/96.18 |
| 6,075,635 | A | 6/2000 | Butrie et al. ............ 359/159 |
| 6,493,121 | B1* | 12/2002 | Althaus .................. 398/135 |
| 6,783,284 | B2* | 8/2004 | Althaus et al. ............ 385/92 |
| 6,805,494 | B2* | 10/2004 | Miki et al. ................ 385/88 |
| 2003/0048511 | A1* | 3/2003 | Tsumori et al. .......... 359/152 |
| 2003/0210866 | A1* | 11/2003 | Kuhara et al. ............ 385/49 |
| 2005/0084217 | A1* | 4/2005 | Yoshimura et al. ...... 385/88 |
| 2005/0180755 | A1* | 8/2005 | Masahiko ................ 398/135 |

* cited by examiner

*Primary Examiner*—Brian M. Healy
(74) *Attorney, Agent, or Firm*—Cha & Reiter, L.L.C.

(57) ABSTRACT

A bidirectional optical transceiver includes a wavelength-selecting filter, an optical fiber, a transmitting module, and a receiving module. The wavelength-selecting filter is placed on an optical axis, passes a first optical signal therethrough, and reflects a second optical signal perpendicularly to the traveling path of the second optical signal. The optical fiber has a face that is opposite to the wavelength-selecting filter and is inclined at an angle of φ with respect to a normal line perpendicular to the optical axis. The transmitting module is placed on the optical axis in opposition to the optical fiber with respect to the wavelength-selecting filter and has a light source for generating the first optical signal and outputting the generated first optical signal to the wavelength-selecting filter at an inclined angle with respect to the optical axis.

16 Claims, 8 Drawing Sheets

BIDIRECTIONAL OPTICAL TRANSCEIVER

CLAIM OF PRIORITY

This application claims priority under 35 U.S.C. § 119 to an application entitled "Bidirectional Optical Transceiver" filed in the Korean Intellectual Property Office on Oct. 31, 2005 and assigned Serial No. 2005-103237, the contents of which are incorporated herein by reference.

BACKGROUND OF THE INVENTION

1. Field of the Invention

The present invention generally relates to an optical transceiver, and in particular, to an optical transceiver used in a bidirectional optical communication field.

2. Description of the Related Art

With an increase demand in transmission of high-quality broadcasting, Internet data, and video conferences at individual homes, the establishment of Fiber to the Home (FTTH) networks using optical fibers is being actively carried out.

An economical optical communication solution, i.e., a 1.25 Gbps Ethernet Passive Optical Network (EPON), includes a single central office (an Optical Line Terminal: OLT) that provides a communication service and a plurality of subscribers including Optical Network Terminals (ONTs) for communication with the central office. In operation, the central office splits an optical signal using a splitter for transmission to the subscribers.

A communication charge imposed on each subscriber includes the cost associated with the maintenance and equipment fees of an ONT and the central office. Thus, it is desirable to minimize the costs of the ONT and the OLT to minimize the communication charge imposed on each subscriber.

U.S. Pat. No. 4,767,171 filed on Feb. 11, 1987 by Siemens Corp. and U.S. Pat. No. 6,075,635 filed on Sep. 4, 1997 by Lucent Technologies Inc. disclose bidirectional optical transceiving modules.

Briefly, the bidirectional optical transceiving module of Siemens Corp. includes three lenses, making its structure complicated and increasing its cost. On the other hand, the bidirectional optical transceiving module of Lucent Technologies Inc. includes two lenses, but the optical axes of an optical fiber and a filter are not easy to arrange and an expensive aspherical lens is additionally required to minimize the occurrence of aberration.

Moreover, the bidirectional optical transceiving module of Lucent Technologies, Inc. has an asymmetric structure in which the incident plane of the optical fiber is arranged remotely from the optical axis to improve the optical coupling efficiency between an optical signal generated from a light source and the optical fiber, causing a tracking error according to a change in temperature or degradation in reliability.

SUMMARY OF THE INVENTION

It is, therefore, an object of the present invention to provide an economical and stable optical transceiving module having improved optical coupling efficiency.

According to one aspect of the present invention, there is provided a bidirectional optical transceiver including a wavelength-selecting filter, an optical fiber, a transmitting module, and a receiving module. The wavelength-selecting filter is placed on an optical axis, passes a first optical signal therethrough, and reflects a second optical signal perpendicularly to the traveling path of the second optical signal. The optical fiber has a face that is opposite to the wavelength-selecting filter and is inclined at an angle of $\phi$ with respect to a normal line perpendicular to the optical axis. The transmitting module is placed on the optical axis in opposition to the optical fiber with respect to the wavelength-selecting filter and has a light source for generating the first optical signal and outputting the generated first optical signal to the wavelength-selecting filter at an inclined angle with respect to the optical axis. The receiving module detects the second optical signal reflected from the wavelength-selecting filter.

BRIEF DESCRIPTION OF THE DRAWINGS

The above features and advantages of the present invention will become more apparent from the following detailed description when taken in conjunction with the accompanying drawings in which.

DETAILED DESCRIPTION OF THE INVENTION

An embodiment of the present invention will now be described in detail with reference to the annexed drawings. For the purposes of clarity and simplicity, a detailed description of known functions and configurations incorporated herein has been omitted for conciseness.

Figure 1:
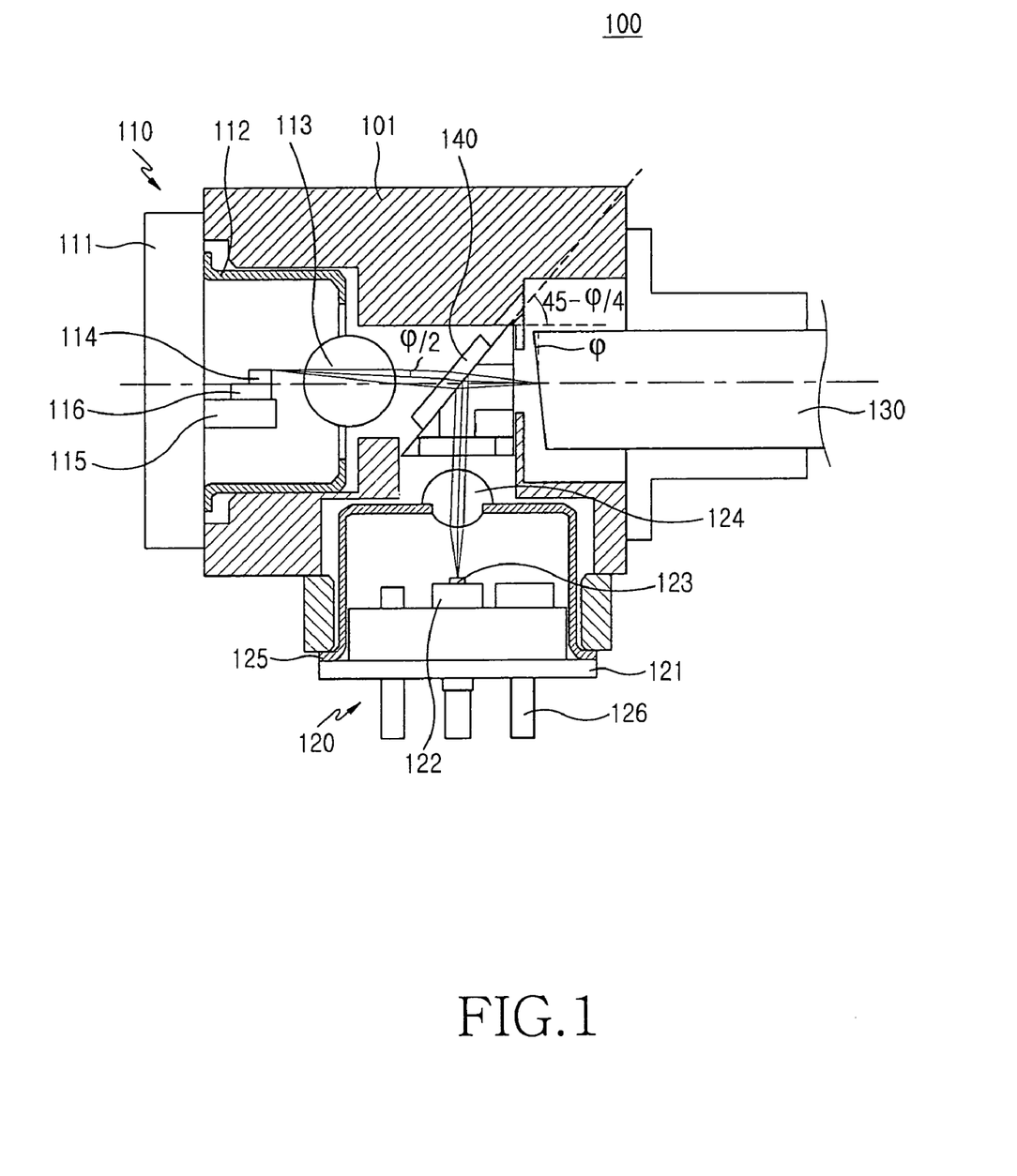
FIG. 1 illustrates a bidirectional optical transceiver according to an embodiment of present invention.

FIG. 1 illustrates a bidirectional optical transceiver 100 according to an embodiment of the present invention. As shown, the bidirectional optical transceiver 100 includes a wavelength-selecting filter 140 for separating the traveling paths of a first optical signal and a second optical signal, a transmitting module 110 for generating the first optical signal, a receiving module 120 for detecting the second optical signal, and an optical fiber 130 for inputting and outputting the first optical signal and the second optical signal. Note that the transmitting module 110 and the receiving module 120 have Top Open Can (TO-CAN) structures.

The optical fiber 130 includes a face that is opposite to the wavelength-selecting filter 140 and is inclined at a predetermined angle with respect to a normal line perpendicular to an optical axis. Since the face of the optical fiber 130, which is opposite to the wavelength-selecting filter 140, is inclined, reflection problems that may occur during the input and output of the first optical signal and the second optical signal can be minimized.

Figure 2:
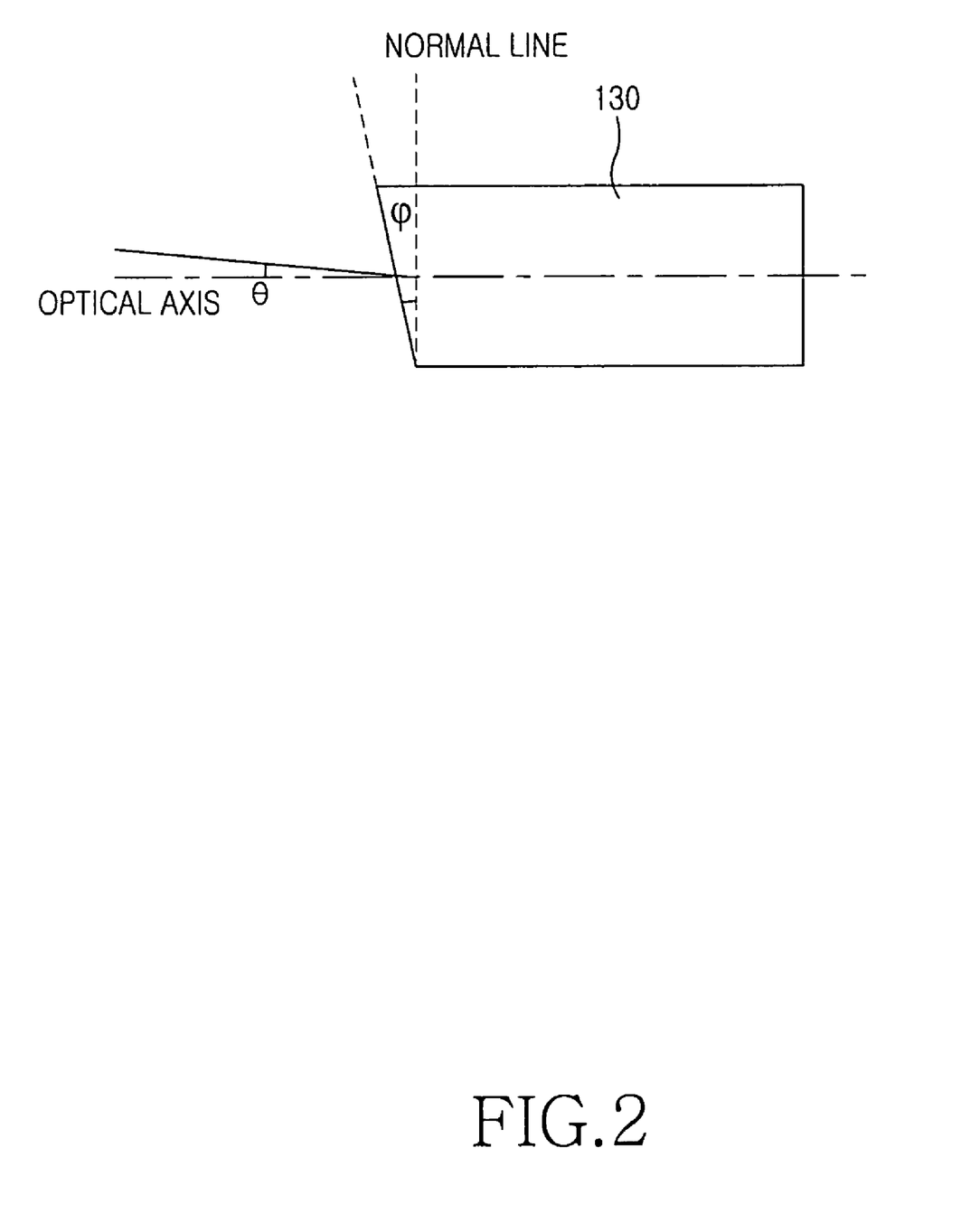
FIG. 2 illustrates an optical fiber of FIG. 1 and an optimal incident angle.

FIG. 2 illustrates the optical fiber 130 of FIG. 1. Referring to FIG. 2, the face of the optical fiber 130 may be inclined at 6° or 8° with respect to the normal line. The major axis of the optical fiber 130 is aligned with the optical axis, and the optical axis has a predetermined angle (θ) with respect to an axis which coincides with the traveling paths of the first optical signal and the second optical signal. The second optical signal output from the inclined optical fiber (inclined by φ) has an angle of θ=φ/2 with respect to the optical axis according to Snell's law as follows. When the first optical signal is incident on the inclined face of the optical fiber (inclined by φ) at an angle of θ=φ/2, the maximum coupling efficiency can be achieved.

$$\theta = \sin^{-1}[n \times \sin(\phi)] - \phi \approx \phi/2 \qquad (1),$$

where n indicates the refractive index of the optical fiber, i.e., 1.5.

Figure 3:
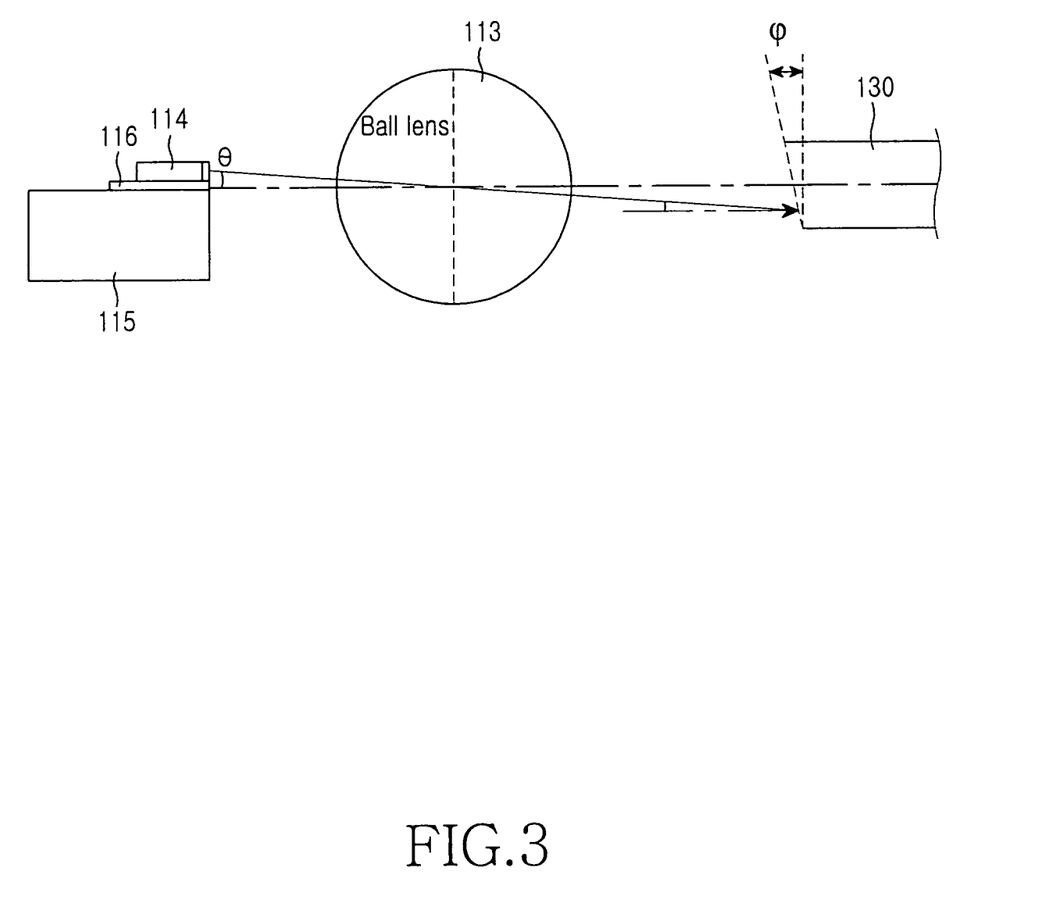
FIG. 3 illustrates a portion of a transmitting module and an optical fiber illustrated in FIG. 1.

FIG. 3 illustrates a portion of the transmitting module 110 and the optical fiber 130. Referring to FIGS. 1 and 3, the transmitting module 110 includes a TO-cap 112, a stem 111, and a light source 114 for generating the first optical signal. The light source 114 is placed on a sub-mount 116 placed on a heat sink 115. The heat sink 115 is placed on the stem 111.

The light source 114 may be a semiconductor laser in which a window region is formed at one end that emits the first optical signal, or a spot-size converting laser. The spot-size converting laser has a 15° far-field pattern that is smaller than a 30° far-field pattern of general lasers.

Figure 4A:
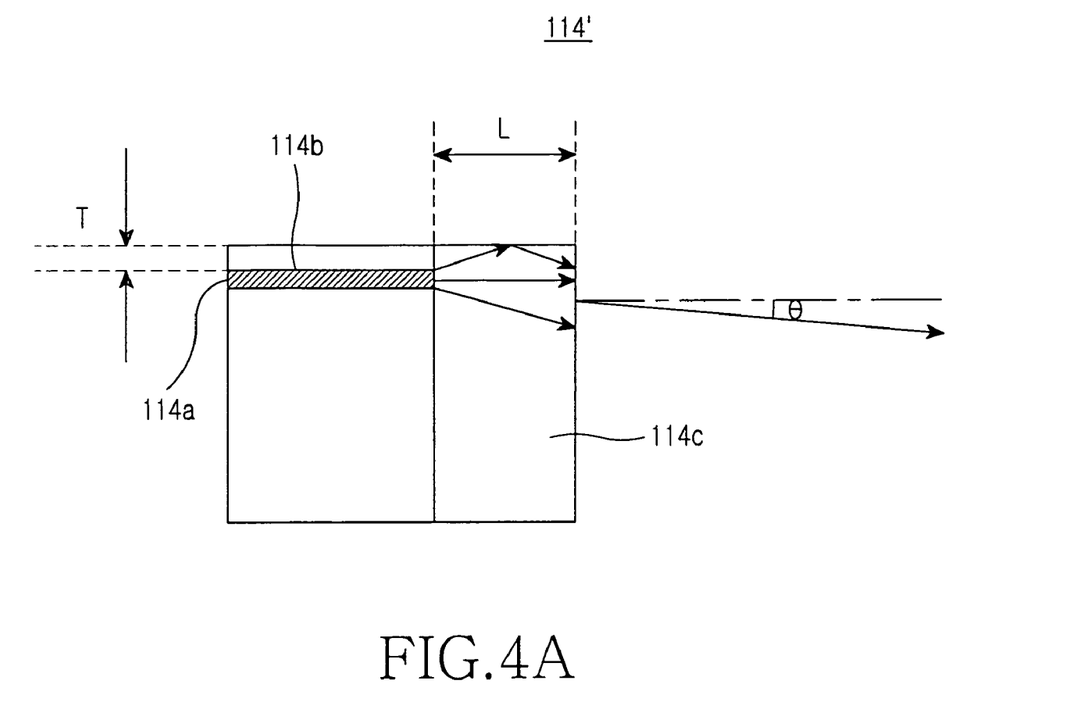
FIG. 4A illustrates a light source having a window region.

FIG. 4A illustrates a semiconductor laser 114' having a window region. The semiconductor laser 114' includes a window region 114c having a predetermined length L, a clad 114b having a predetermined thickness T, and an active layer below the clad 114b. By adjusting the length L of the window region 114c and the thickness T of the clad 114b, the radiation angle (θ) of the first optical signal with respect to the optical axis can be adjusted selectively.

Figure 4B:
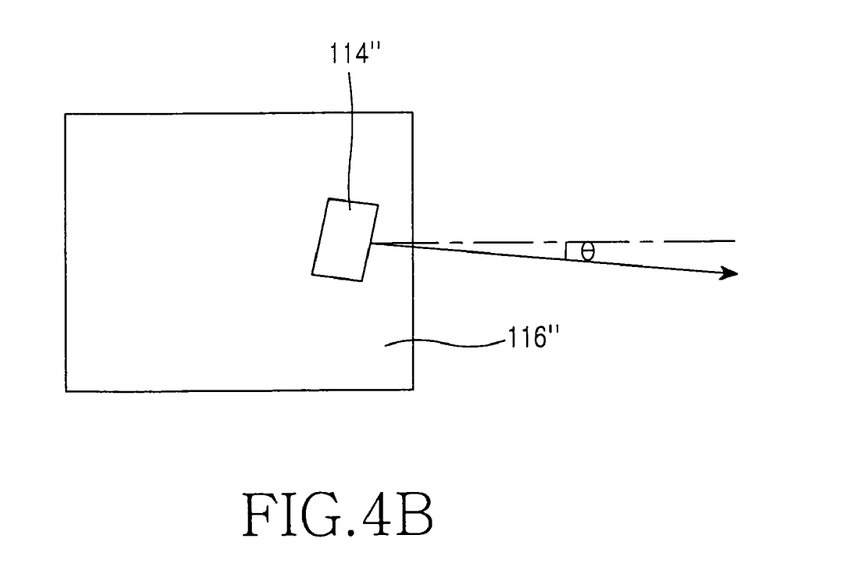
FIG. 4B illustrates a light source that generates an optical signal that is tilted with respect to an optical axis.

In a light source 114" of FIG. 4B, a face that emits the first optical signal is tilted with respect to the optical axis (indicated by a chain line) on a sub-mount 116". In FIG. 4B, the radiation angle (θ) of the first optical signal, which is tilted with respect to the optical axis, is adjusted.

The TO-cap 112 is placed on the stem 111, and a viewing window is formed at one end of the traveling path of the first optical signal. A ball lens 113 is placed in the viewing window. As illustrated in FIG. 3, the first optical signal passes through the center of curvature of the ball lens 113 and is output to the wavelength-selecting filter 140.

The coupling efficiency between the first optical signal and the optical fiber 130 is improved when the inclined angle (φ) of the first optical signal with respect to the optical axis is ½ the inclined angle (θ) of the face of the optical fiber 130 with respect to the normal line. The relationship between the inclined angle (φ) of the first optical signal with respect to the optical axis and the inclined angle (θ) of the face of the optical fiber 130 with respect to the normal line can be known from Snell's law. When the first optical signal is output from the light source 114 at a radiation angle of 3° or 4° with respect to the optical axis, its coupling efficiency with the face of the optical fiber 130 having an inclination of 6° or 8° that is two times the radiation angle is maximized.

In the present invention, the radiation angle of the first optical signal generated from the transmitting module 110 with respect to the optical axis is adjusted using a cheap ball lens instead of an expensive aspherical lens, thereby optimizing the incident angle (θ) of the first optical signal incident to one end of the optical fiber 130 and the inclined angle (φ) of the optical fiber 130. The relationship between the inclined angle (θ) of the first optical signal with respect to the optical axis and the inclined angle (φ) of the optical fiber 130 with respect to the normal line of the face can be expressed as shown in Equation (1).

Figure 5:
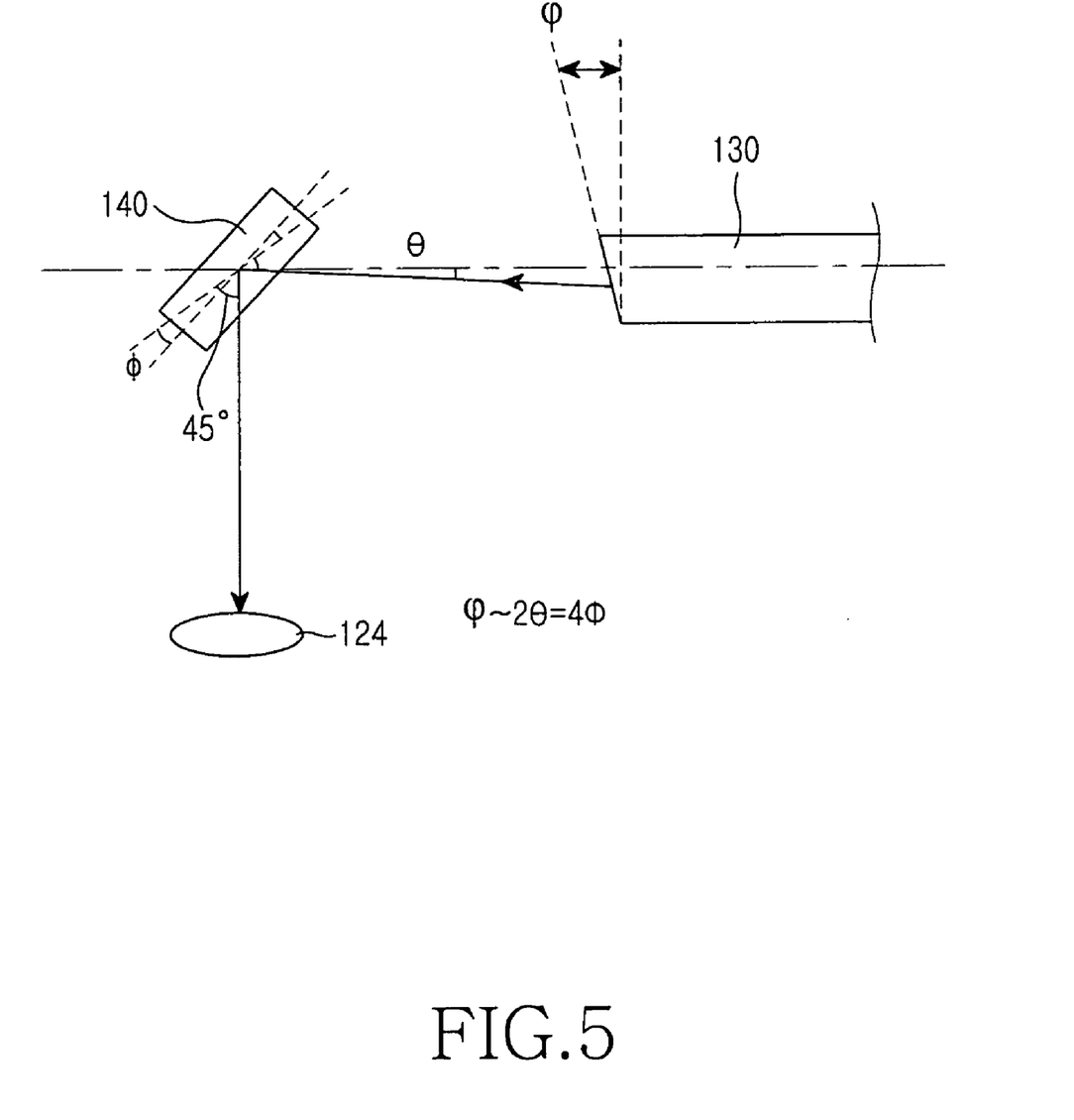
FIG. 5 illustrates a wavelength-selecting filter and an optical fiber illustrated in FIG. 1.

FIG. 5 illustrates the wavelength-selecting filter 140 and the optical fiber 130 of FIG. 1. As shown, the wavelength-selecting filter 140 disposed between the optical fiber 130 and the transmitting module 110 passes the first optical signal to the optical fiber 130 therethrough and reflects the second optical signal input from the optical fiber 130 to the receiving module 120 perpendicularly to the traveling direction of the second optical signal. By being inclined at 43° (φ=8°) or 43.5° (φ=6°) with respect to the optical axis (φ=θ/2~φ/4), the wavelength-selecting filter 140 can reflect the second optical signal to an asymmetric ball lens 124 of the receiving module 120 perpendicularly to the optical axis.

The receiving module 120 includes the asymmetric ball lens 124, a TO-cap 125, a stem 121, and an optical detector 123 placed on the stem 121. The receiving module 120 is disposed perpendicularly to and below the wavelength-selecting filter 140. The optical detector 123 may be a photodiode.

In the TO-cap 125, a viewing window is formed on the traveling path of the second optical signal and the asymmetric ball lens 124 is inserted into and fixed to the viewing window. The second optical signal reflected from the wavelength-selecting filter 140 is incident into the optical detector 123 through the asymmetric ball lens 124.

Figure 6A:
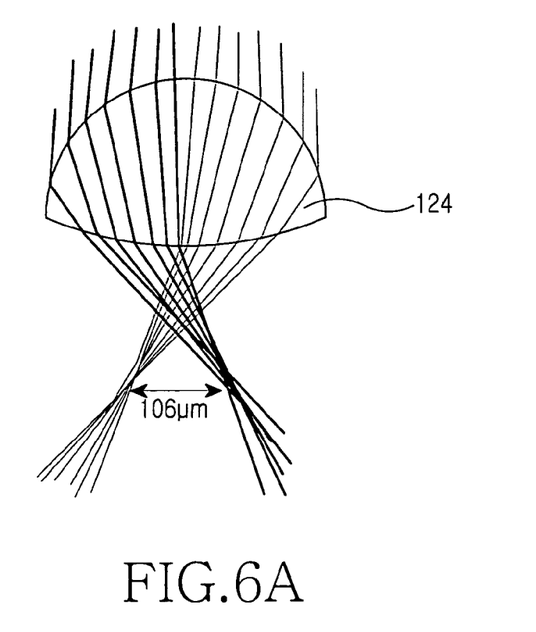
FIGS. 6A and 6B are views for explaining the size of a focused beam and the assembly tolerance of a photodiode according to the inclined angle of a second optical signal that is incident from a wavelength-selecting filter to an asymmetric ball lens.
Figure 6B:
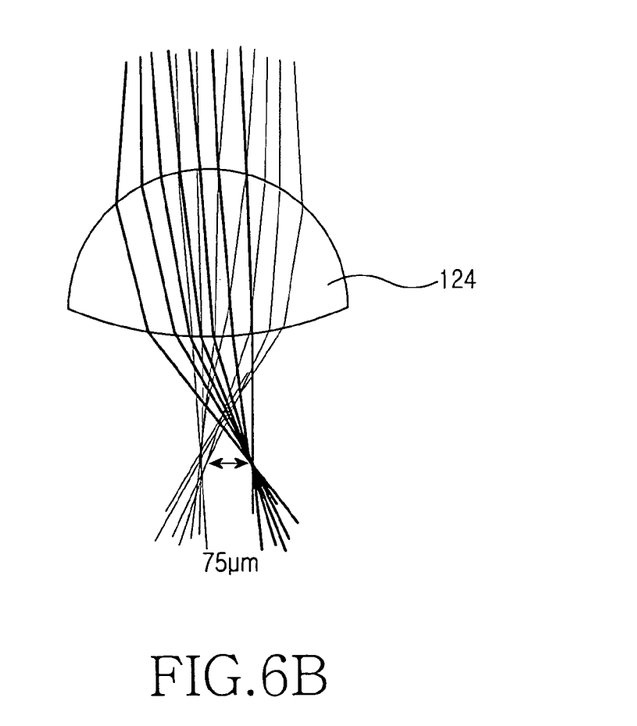

FIGS. 6A and 6B illustrates the size of a focused beam and the assembly tolerance of the optical detector 123 according to the inclined angle of the second optical signal that is incident from the wavelength-selecting filter 141 to the asymmetric ball lens 124. In FIG. 6A, the second optical signal is reflected to the asymmetric ball lens 124 perpendicularly to the optical axis by adjusting the angle of the wavelength-selecting filter 140. In FIG. 6B, the second optical signal emitted from the inclined face of the optical fiber 130 is incident to the asymmetric ball lens 124 at a predetermined inclined angle when the wavelength-selecting filter 140 has a general angle of 45°. The predetermined inclined angle corresponds to the second optical signal emitted from the optical fiber 130 tilt at 4° or 8°.

Referring to FIGS. 6A and 6B, in case of the second optical signal being incident perpendicularly to the optical axis, when the optical detector 123 is disposed within 106 μm from the center of the asymmetric ball lens 124, the size of a focused beam is 50 μm or less. Thus, the optical detector 123 having a receiving window with a 50 μm diameter can receive the whole incident second optical signal. On the other hand, in case of the second optical signal being incident at a predetermined inclined angle, only when the optical detector 123 is disposed within 75 μm from the center of the asymmetric ball lens 124, the optical detector 123 can receive the whole incident second optical signal. Since a manual arrangement is generally used for the assembly of a stem, an optical detector, and a ball cap of a receiving module, the second optical signal can be more effectively detected with a wider assembly range of the optical detector.

The optical detector 123 detects the second optical signal and may be a photodiode. The optical detector 123 is placed on the stem 121 by a sub-mount 122 and is connected to a plurality of leads 126 that penetrate the stem 121.

The bidirectional optical transceiver according to the present invention can improve coupling efficiency by inputting the first optical signal that is inclined at a predetermined angle with respect to the optical axis according to Equation (1) to the inclined face of the optical fiber.

Figure 7A:
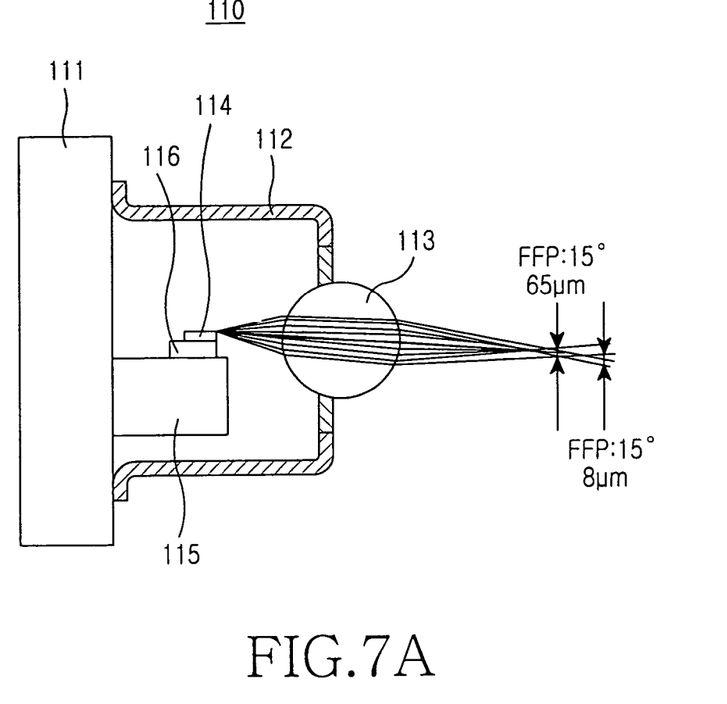
FIGS. 7A and 7B illustrate arrangements of a light source module of FIG. 1 with the sizes of a focused optical signal according to Far-Field Patterns (FFPs) in a structure where the radiation angle of a light source is adjusted for the optimal incident angle of FIG. 2 and a beam passes through the center of a ball lens and in a structure where the radiation angle of the light source is maintained level and the position of the ball lens is adjusted.
Figure 7B:
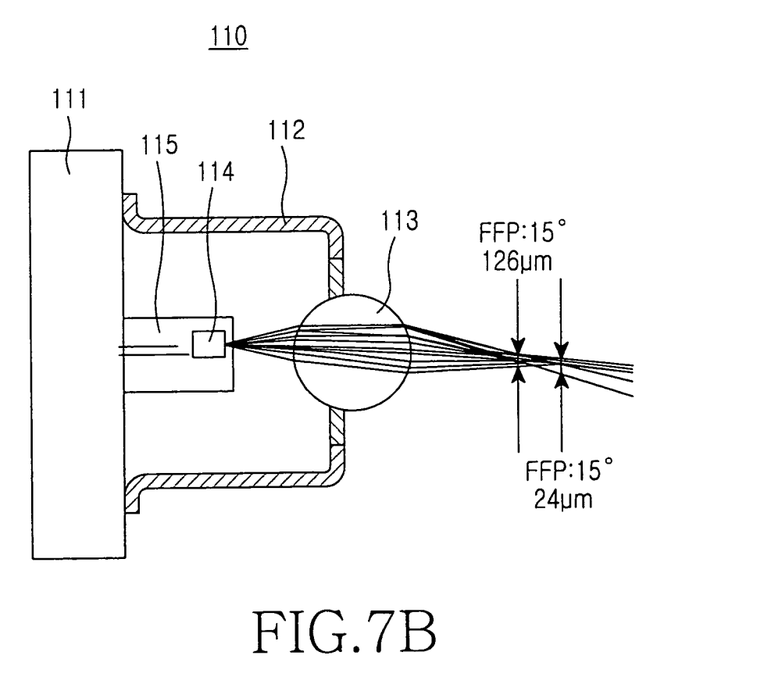

FIGS. 7A and 7B illustrate arrangements of a light source module of FIG. 1.

In FIG. 7A, the first optical signal is output from the light source 114 at a predetermined optimal angle, passes through the center of the ball lens 113, and converges into a focus according to the present invention. Since the first optical signal passes through the center of the ball lens 113, the effect of aberration of the ball lens 113 is minimized.

In FIG. 7B, since the first optical signal is output from the light source 114 in parallel with the optical axis, the position of the ball lens 113 is moved to deflect the first optical signal out of the center of the ball lens 113 and cause the first optical signal passing through the ball lens 113 to maintain the predetermined optimal angle. In this case, the size of a focused beam increases due to aberration of the ball lens 113. In FIGS. 7A and 7B, the path of the first optical signal and the size of the focused first optical signal are shown for 15° and 30° Far-Field Patterns (FFP) that indicate the radiation angle of the first optical signal from the transmitting module 110. In Table 1, the size of the focused first optical signal according to FFP is shown for FIGS. 7A and 7B. Since the diameter of a single mode optical fiber core is about 10 μm, it can be seen that the arrangement in FIG. 7A according to the present invention exhibits higher coupling efficiency than the arrangement in FIG. 7B.

Table 1 shows comparison between FIG. 7A and FIG. 7B.

TABLE 1

| FFP(°) | Inclined angle of optical signal with respect to optical axis (FIG. 7A) | Lens moving distance (FIG. 7B) |
|---|---|---|
| 15 | 8 μm | 24 μm |
| 20 | 17 μm | 50 μm |
| 30 | 65 μm | 126 μm |

Since the transmitting module 110 according to the present invention includes a spot-size converting laser or a semiconductor laser having a radiation angle pattern of a small angle, the coupling efficiency of the optical fiber can be improved.

Figure 8A:
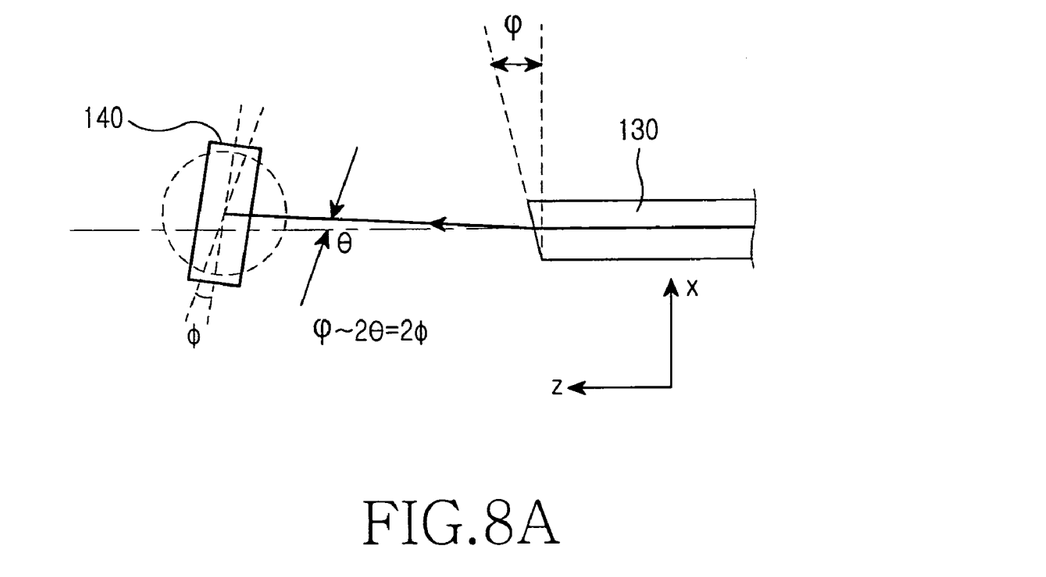
FIGS. 8A and 8B illustrate the angle of a wavelength-selecting filter for causing an optical signal to be incident on a receiving module at 90° when a transmitting module and an optical fiber are rotated at 90° with respect to an optical axis in FIG. 1.
Figure 8B:
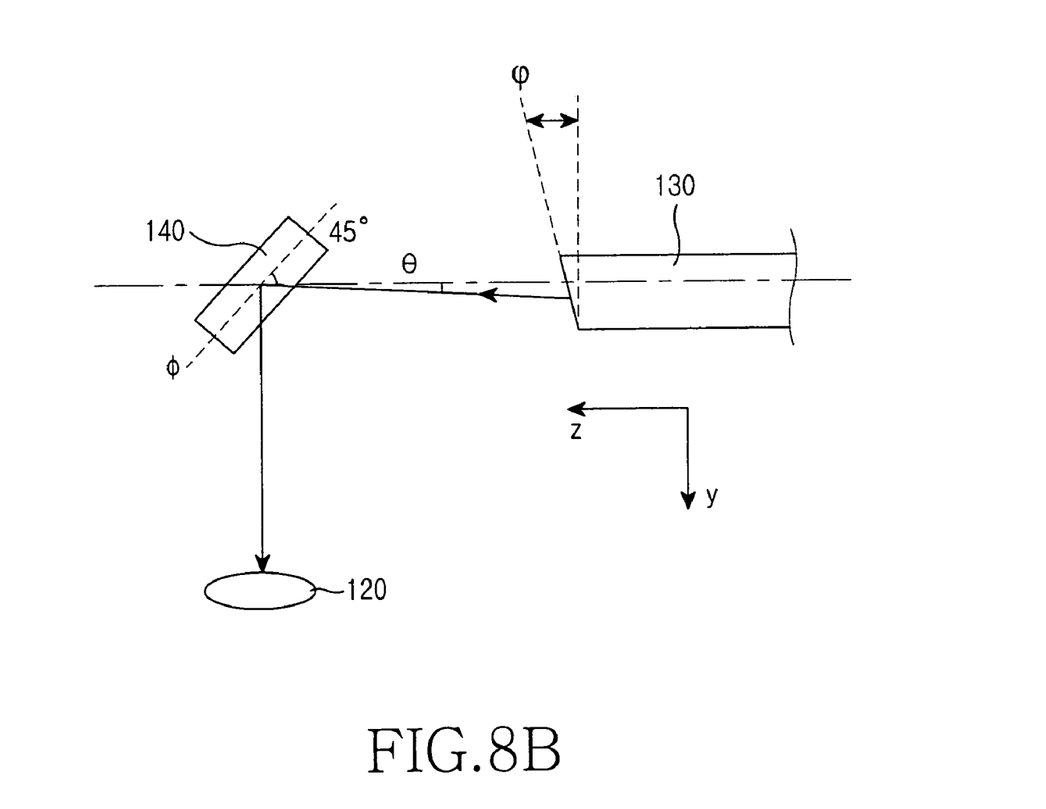

To facilitate the mounting of the transmitting module 110 onto a connection board (not shown), it is necessary to rotate the transmitting module 110 and the optical fiber 130 with respect to the optical axis. FIGS. 8A and 8B illustrate the wavelength-selecting filter 140 and the optical fiber 130 showing when the transmitting module 110 and the optical fiber 130 of FIG. 1 are rotated at 90° on the optical axis.

When the transmitting module 110 and the optical fiber 130 are rotated at 90° on the optical axis, the second optical signal input to the wavelength-selecting filter 140 is incident at an angle of θ=φ/2 with respect to the z axis (horizontal direction) in the x-z plane. In this case, by rotating the wavelength-selecting filter 140 having 45° by φ/2 with respect to the y axis, the incident second optical signal can be reflected perpendicularly to and below its traveling path.

When the transmitting module 110 and the optical fiber 130 having an inclined face (inclined by φ) rotated at 45° with respect to the optical axis from the state of FIG. 1, the second optical signal is incident to the wavelength-selecting filter 140 at an incident angle while being inclined from the z axis towards the x and y axes. The incident angle can be defined as follows;

$$\theta_x = \theta_y = \tan^{-1}(1/\sqrt{2}\tan(\phi/2)) \quad (2)$$

In order for the second optical signal reflected from the wavelength-selecting filter 140 to be perpendicularly incident to the receiving module 120, the adjustment angle $\phi_y$ of the wavelength-selecting filter 140 may be defined by Equation (3) in the y-z plane as shown in FIG. 5 and the rotation angle $\phi_x$ of the wavelength-selecting filter 140 with respect to the y axis can be defined by Equation (4) in the x-z plane as shown in FIGS. 8A and 8B. FIG. 8A is a plane view of the wavelength-selecting filter 140 viewed from top and FIG. 8B is a side view of the wavelength-selecting filter 140.

$$\phi_y = \theta_y/2 \quad (3)$$

When the transmitting module 110 and the optical fiber 130 are rotated at 45° on the optical axis, the rotation angle of the wavelength-selecting filter with respect to the x axis can be defined as follows;

$$\phi_x = \phi_x \quad (4)$$

Since an optical signal incident to an optical fiber from a transmitting module is emitted at an angle that allows the optical signal to have the maximum coupling efficiency in the present invention, arranging the optical fiber is easier than when deflecting the optical fiber out of an optical axis and an error allowable range may also be enlarged. Moreover, a cheap ball lens can be used for the transmitting module with the improvement in the coupling efficiency of the transmitting module. Since the optical signal is perpendicularly incident to a receiving module by adjusting the direction of a wavelength-selecting filter, a loss in the coupling efficiency of the receiving module using a cheap asymmetric ball lens can be minimized. Furthermore, the transmitting module includes cheap spot-size converting laser and ball lens, thereby providing an economical bidirectional optical transceiver.

While the present invention has been shown and described with reference to a preferred embodiment thereof, it will be understood by those skilled in the art that various changes in form and details may be made therein without departing from the spirit and scope of the invention.

What is claimed is:
1. A bidirectional optical transceiver comprising:
a wavelength-selecting filter placed or an optical axis for passing a first optical signal therethrough and reflecting a second optical signal perpendicularly to a traveling path of the second optical signal;
an optical fiber having a face opposite to the wavelength-selecting filter and an end surface inclined at an angle of φ with respect to a normal line perpendicular to the optical axis;
a transmitting module placed on the optical axis in opposition to the optical fiber with respect to the wavelength-selecting filter and having a light source for generating the first optical signal and outputting the generated first optical signal to the wavelength-selecting filter at a predefined inclined angle with respect to the optical axis; and a receiving module for detecting the second optical signal reflected from the wavelength-selecting filter.

2. The bidirectional optical transceiver of claim 1, further comprising:
a sub-mount disposed below the light source; and
a heat sink disposed below the sub-mount.

3. The bidirectional optical transceiver of claim 1, wherein the light source outputs the first optical signal at an inclined angle of $\theta=\phi/2$ with respect to the optical axis, and the first optical signal is incident on the face of the optical fiber at an inclined angle of $\theta=\phi/2$ with respect to the optical axis.

4. The bidirectional optical transceiver of claim 1, wherein the light source comprises a semiconductor laser having a window region and outputting the first optical signal at an inclined angle of $\theta=\phi/2$ with respect to the optical axis by adjusting the area of the window region and the thickness of a clad.

5. The bidirectional optical transceiver of claim 1, wherein the light source is inclined at an angle of $\theta=\phi/2$ with respect to the normal line of the optical axis to output the first optical signal at an angle of $\theta=\phi/2$ with respect to the normal line of the optical axis.

6. The bidirectional optical transceiver of claim 1, wherein the light source is arranged such that the first optical signal passes through the center of a ball lens.

7. The bidirectional optical transceiver of claim 1, wherein the end surface of the optical fiber is inclined at an angle of 6-8° with respect to the normal line perpendicular to the optical axis, and the first optical signal is output from the light source at an inclined angle of 3-4° that is ½ the inclined angle of the face of the optical fiber.

8. The bidirectional optical transceiver of claim 1, wherein the light source comprises a spot-size converting laser having a small-angle far-field pattern to improve optical coupling efficiency.

9. The bidirectional optical transceiver of claim 1, wherein the wavelength-selecting filter is inclined at an angle of $45-\phi=45-\theta/2$ with respect to the optical axis such that the second optical signal is perpendicularly incident to the receiving module.

10. The bidirectional optical transceiver of claim 1, wherein the wavelength-selecting filter is inclined at an angle of 43° or 43.5° with respect to the optical axis.

11. The bidirectional optical transceiver of claim 1, wherein the transmitting module and the optical fiber are rotated at a predetermined angle with respect to the optical axis.

12. The bidirectional optical transceiver of claim 11, wherein the second optical signal output from the optical fiber at a predetermined inclined angle is perpendicularly incident to the receiving module by adjusting the angle of the wavelength-selecting filter.

13. The bidirectional optical transceiver of claims 11, wherein when the transmitting module and the optical fiber are rotated at 90°, the wavelength-selecting filter having 45° is rotated at an angle of $\phi=\theta=\phi/2$ with respect to an axis that perpendicularly connects the wavelength-selecting filter and the receiving module below the wavelength-selecting filter, such that the second optical signal is perpendicularly incident to the receiving module from the wavelength-selecting filter.

14. The bidirectional optical transceiver of claims 11, wherein when the transmitting module and the optical fiber are rotated at 45°, the angle of the second optical signal output from the optical fiber at an inclined angle is divided into a component before being 45° rotated and a component to be 90° rotated, the component before being 45° rotated is used to adjust the wavelength-selecting filter having 45° by $\phi_x=\theta_x/2$, and the component to be 90° rotated is used to rotate the wavelength-selecting filter by $\phi_y=\theta_y$ with respect to an axis that perpendicularly connects the wavelength-selecting filter and the receiving module below the wavelength-selecting filter, such that the second optical signal is perpendicularly incident to the receiving module from the wavelength-selecting filter.

15. The bidirectional optical transceiver of claim 1, wherein the transmitting module and the receiving module have TO-CAN structures.

16. The bidirectional optical transceiver of claim 1, wherein the receiving module comprises an optical detector for receiving whole incident second optical signal.

* * * * *